Feb. 9, 1971 C. W. SCHAEFFER 3,561,026
KNOCKOUT ASSEMBLY
Filed July 25, 1968
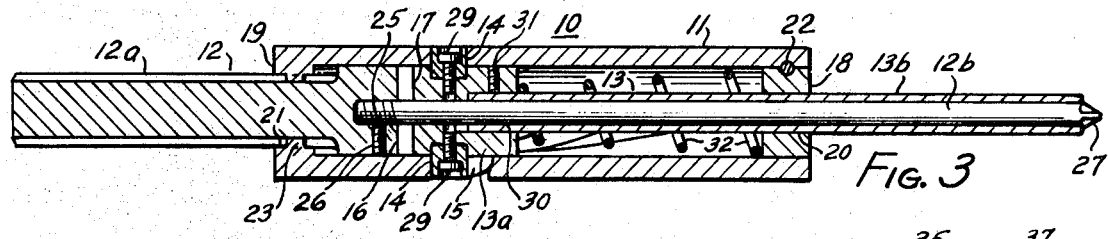
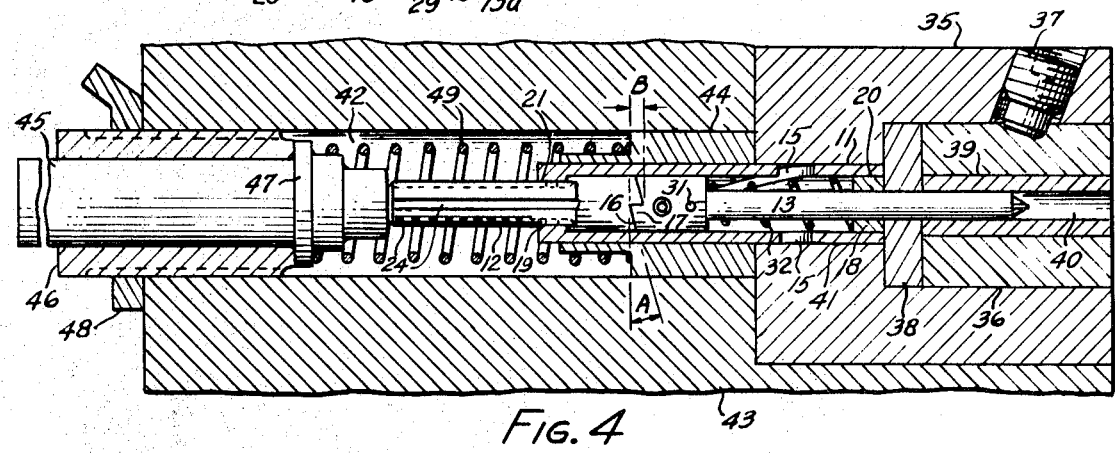
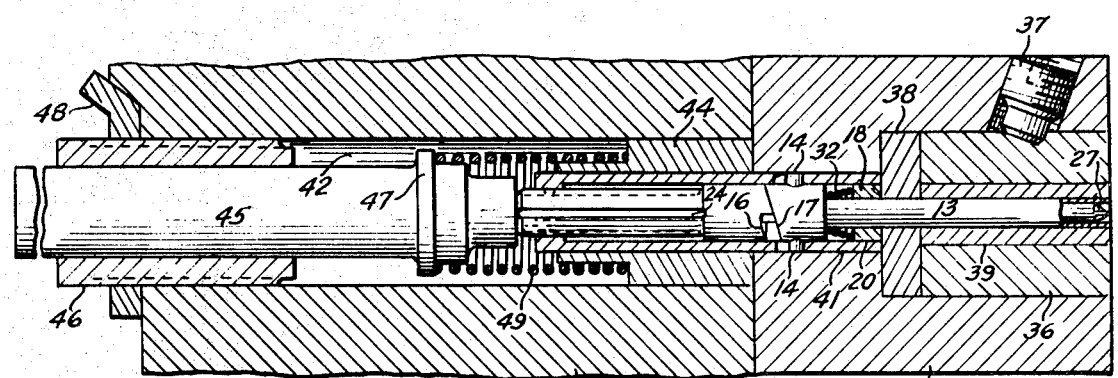
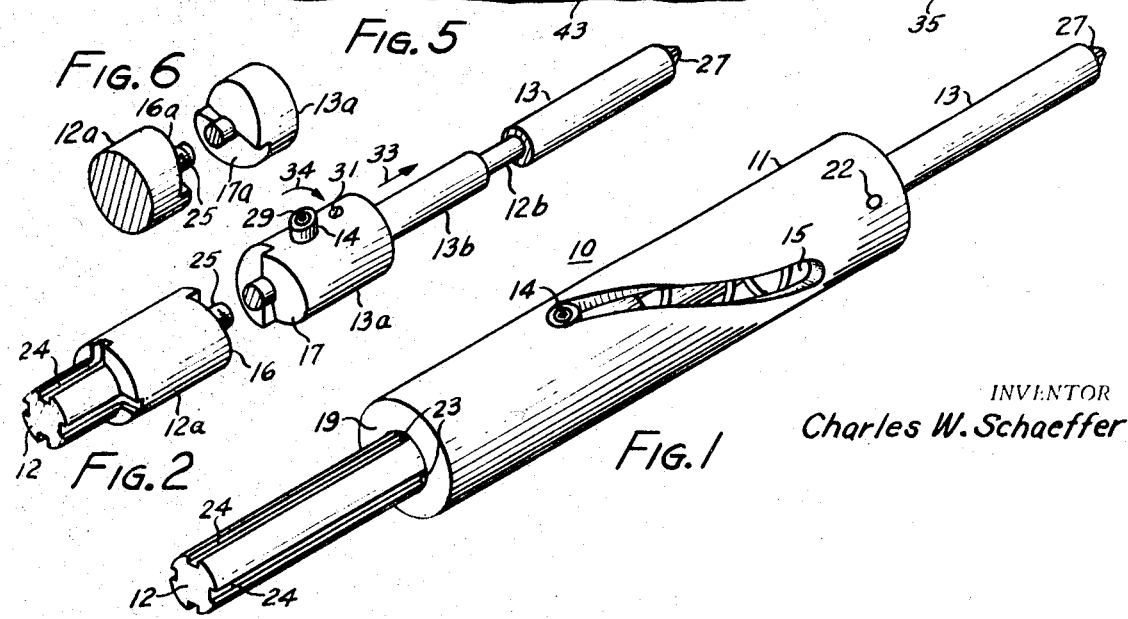
INVENTOR
Charles W. Schaeffer 3,561,026
KNOCKOUT ASSEMBLY
Charles W. Schaeffer, Lebanon, Pa., assignor to Bethlehem
  Steel Corporation, a corporation of Delaware
  Filed July 25, 1968, Ser. No. 747,523
  Int. Cl. B23g 11/00; B21k 27/00; B21d 45/00
U.S. Cl. 10—11                                                8 Claims

ABSTRACT OF THE DISCLOSURE

A knockout assembly for use in a forming machine has a rod with a tip shaped to form a desired indentation in a workpiece and a sleeve which surrounds the rod to eject the workpiece from the machine. The rod and sleeve are slidably mounted in a body. An arrangement of cams causes the sleeve to move a greater distance than the rod and thereby strip the workpiece from the tip of the rod and eject it from the machine.

BACKGROUND OF THE INVENTION

This invention relates in general to a knockout assembly for a forming machine and more particularly to a knockout assembly which aids in forming an indentation in a workpiece and thereafter properly ejects the workpiece from the machine.

A forming machine, such as a boltmaker or nutformer, generally comprises a stationary die and a reciprocating punch. The machine shears a workpiece from a coil or rod and transfers it to a position adjacent the die. The punch moves toward the die and forces the workpiece into an opening in the die. A die knockout assembly rod positioned within the die opening stops the movement of the workpiece. As the punch continues its movement toward the die, a force is applied to the workpiece. This force causes the workpiece to assume the shape formed by the die opening, rod and punch. Thereafter, the punch moves away from the die, and the knockout assembly rod ejects the workpiece from the die. If the shape of the punch is such as to cause the workpiece to adhere to the punch, a punch knockout assembly may be used to eject the workpiece from the punch.

The above sequence of operations can be performed satisfactorily provided the surface of the knockout assembly rod is relatively flat and lies in a plane substantially perpendicular to the direction of motion of the punch. However, if to produce a desired shape of formed workpiece, the surface of the knockout assembly is shaped or positioned other than as described above, there is a tendency for the workpiece to adhere to the knockout assembly rod and not be properly ejected. Improper ejection of the workpiece may cause delays in production, improperly formed workpieces, and damage to the forming machine and its tooling.

SUMMARY OF THE INVENTION

An object of this invention is to provide a knockout assembly for a forming machine which properly ejects a workpiece from the machine.

Another object of this invention is to provide a knockout assembly capable of forming an indentation in a workpiece and thereafter properly ejecting the workpiece from a forming machine.

The foregoing objects can be obtained by providing a knockout assembly having a body, a rod slidably mounted in the body and shaped to form a desired indentation in a workpiece, a sleeve which encircles or surrounds one end of the rod, and cam means to cause the sleeve to move a greater distance than the rod and thereby strip the workpiece from the rod and eject it from the machine.

BRIEF DESCRIPTION OF THE DRAWINGS

FIG. 1 is a three dimensional view of the knockout assembly.

FIG. 2 is a three dimensional view of the knockout assembly, partly broken, with certain parts separated or removed.

FIG. 3 is a longitudinal cross section view of the knockout assembly.

FIG. 4 is a longitudinal cross sectional view, partly broken, of the knockout assembly in a retracted position with a die.

FIG. 5 is a view similar to FIG. 4 except the knockout assembly is an extended position within the die.

FIG. 6 is a three dimensional view of a different embodiment of a portion of the knockout assembly.

DESCRIPTION OF THE PREFERRED EMBODIMENT

In the drawings and with particular reference to FIGS. 1, 2 and 3, the knockout assembly 10 comprises a hollow cylindrical body 11, a rod 12 slidably mounted within the body 11, a sleeve 13 slidably mounted within the body 11 and surrounding one end of rod 12, guide means including roller 14 fixed to the sleeve 13 and in contact with a helical slot 15 in body 11, and a first cam surface 16 on rod 12 in contact with a second cam surface 17 on sleeve 13.

Referring to FIGS. 3 to 5, hollow cylindrical body 11 has a removable plug 18 at one end and an integral inwardly extending shoulder 19 at the other end. Plug 18 has a circular opening 20 which is in longitudinal alignment with a circular opening 21 formed by shoulder 19. Plug 18 is removably attached to body 11 by a pin 22 which passes through a hole in body 11 and a groove in plug 18, as shown in FIG. 3. With reference to FIG. 1, four equally spaced keys 23 extend into opening 21 from shoulder 19. Body 11 has two helical slots 15, one as shown and the other on the opposite side of body 11.

As shown in FIGS. 2 and 3, rod 12 consists of two parts, 12a and 12b. Part 12a is in sliding contact with shoulder 19 and the interior surface of body 11 and includes keyways 24 which engage keys 23. Part 12b has a substantially reduced diameter and extends through opening 20 in plug 18 of body 11. Threaded connection 25 and set screw 26 detachably secure the two parts 12a and 12b of rod 12 together. Part 12b of rod 12 has a tip 27 which is shaped to produce a cross recess in a workpiece (not shown), however any shaped tip desired could be provided. Keys 23 of body 11 and keyways 24 on rod 12 restrict the rod 12 to straight line movement within body 11. While rod 12 is shown and described as consisting of two parts 12a and 12b, rod 12 may be made in one piece. When a two part rod as described above is used, part 12b may be readily replaced by a similar part having a different shaped tip.

As shown in FIG. 3, a sleeve 13 consisting of two parts 13a and 13b is also slidably mounted within body 11. Sleeve 13 surrounds part 12b of rod 12. Part 13a of sleeve 13 has an enlarged diameter and is in sliding contact with the interior surface of body 11. Rollers 14, 14 are rotatably attached by set screws 29 to part 13a of sleeve 13 and extend into helical slots 15 of body 11 and act as a cam follower within helical slots 15. Thus, as sleeve 13 slides within body 11, rollers 14, 14 move within helical slots 15, 15 and cause sleeve 13 to rotate within body 11. Part 13b of sleeve 13 is tubular in shape, extends within opening 30 in part 13a and is detachably secured to part 13a by set screw 31. While sleeve 13 is shown and described as consisting of two parts, sleeve 13 may be made in one piece. If sleeve 13 is made in two parts as described, part 13b may be readily replaced by a similar part having a length and cross section as desired.

Positioned on the abutting surfaces of part 13a of sleeve 13 and part 12a of rod 12 are cam surfaces 17 and 16, respectively. Compression spring 32, which encircles sleeve part 13b, has one end in contact with plug 18 of body 11 and the other end in contact with part 13a of sleeve 13. Spring 32 acts to maintain cam surfaces 16 and 17 in contact with each other. Cam surfaces 16 and 17 lie in a plane which extends obliquely to the direction of movement of rod 12 indicated by arrow 33 in FIG. 2.

In FIG. 2, cam surface 17 of sleeve 13 has been separated from cam surface 16 of rod 12 for reasons of clarity. As best shown in FIG. 2, cam surfaces 17 of sleeve 13 comprises two segments, each of which segment is one half of the cross sectional surface of the sleeve 13. Cam surface 16 of rod 12 consists of like segments. Each surface 16, 17 is arranged so that as sleeve 13 rotates in the direction of arrow 34 in response to rollers 14 being guided by helical slot 15, the mating cam surfaces 16 and 17 cause sleeve 13 to slide over part 12b of rod 12 and move in the direction of arrow 33. The distance that the sleeve 13 moves in the direction of arrow 34 as a result of this rotation is a function of the angle A shown in FIG. 4 and the amount of rotation supplied to sleeve 13 by rollers 14 and helical slots 15. Generally, this distance should be about equal to the length of tip 27 of rod 12. For example, the cam surfaces 16 and 17 shown in the drawings supply a movement of B inches for a rotation of 180°. Since the helical slot 15 shown in FIG. 1 provides a rotation of about 90° to sleeve 13, sleeve 13 would move B/2 inches as roller 14 travels from one end of helical slot 15 to the other end. It should be apparent that cam surfaces 16 and 17 could have only one segment or more than two segments and that helical slot 15 could be adapted to rotate sleeve 13 more or less than 90°.

It may be desirable in some applications of the knockout assembly to provide an arrangement wherein the distance sleeve 13 moves in the direction of arrow 33 is less than the distance rod 12 moves in this direction. This can be accomplished by providing mating cam surfaces 16a and 17a which slope in the direction shown in FIG. 6. Thus, as sleeve 13 rotates, mating cam surfaces 16a and 17a cause sleeve 13 to move in a direction opposite the direction of arrow 33. Obviously, the adjoining free ends of part 12b and 13b would be arranged relative to each other in accordance with the desired result to be accomplished. For example, in the retracted position shown in FIG. 4, the free ends of part 12b and part 13b could be aligned within die opening 40. The tip of sleeve part 13b could have an indent forming surface and the tip of part 12b could be flat. If so arranged, the tip of part 12b would extend beyond the tip of part 13b when the knockout assembly was in the extended position shown in FIG. 5. Thus rod part 12b acts to strip the workpiece off sleeve part 13b.

FIGS. 4 and 5 show the knockout assembly 10 positioned in a forming machine. Numeral 35 represents a die block of a forming machine having a die holder 36 held in die block 35 by holding screw 37. A backup plate 38 having a central opening therein is positioned between die holder 36 and die block 35. Located within die holder 36 is a die 39 having an opening 40 for the reception of a workpiece (not shown). Extending to the left of die opening 40 as viewed in FIGS. 4 and 5 and in alignment therewith is an opening 41 in die block 35 and an opening 42 in die bed 43. One end of body 11 of knockout assembly 10 is positioned within opening 41 and is in contact with backup plate 38. Part 12b of rod 12 and 13b of sleeve 13 extends through backup plate 38 and within the opening 40 in die 39. Body 11 also extends within stationary bushing 44 which is positioned within die bed 43. Machine rod 45 which is slidably mounted within adjustable bushing 46 is in contact with the end of part 12a of rod 12. By so positioning the knockout assembly 10, the frictional forces between the end of the body 11 and backup plate 38 and the end of rod 12 and machine rod 45 eliminate any tendency for body 11 to rotate. Machine rod 45 has a head 47 which limits the movement of machine rod 45 to the left as shown in FIGS. 4 and 5. Adjustable bushing 46 is in threaded engagement with die bed 43 and adjustably secured thereto by wing nut 48. One end of compression spring 49 is in contact with stationary bushing 44 and the other end is in contact with the head 47 of machine rod 45. Thus, compression spring 49 causes machine knockout rod 45 to be biased to the left of FIGS. 4 and 5.

During the operation of the knockout assembly 10 and with the assembly 10 and machine rod 45 in the retracted position as shown in FIG. 4, a workpiece (not shown) to be formed is forced into the die opening 40 by a punch (not shown). The punch forces the workpiece into contact with the tip 27 of rod 12 and continued force by the punch causes the workpiece to be indented by the tip 27. Of course, the workpiece may also be formed to the shape of die opening 40 and punch. Thereafter the punch moves away from the die 39.

Next, the forming machine knockout block (not shown) causes machine rod 45 to move to the right from its position shown in FIG. 4 to its position shown in FIG. 5. This movement of the machine rod 45 causes rod 12 to move in a straight line and causes sleeve 13 to move to the right. Rollers 14 attached to sleeve 13 and in contact with helical groove 15 of body 11 causes sleeve 13 to rotate. This rotation causes cam surface 17 on sleeve 13 to ride up on cam surface 16 of rod 12 and thus cause sleeve 13 to move a straight line distance greater than the movement of the rod 12. This greater movement allows the sleeve 13 to strip the workpiece from the tip 27 of the rod 12, properly eject the workpiece from the die opening 40, and assume a position with respect to the rod 12 as shown in FIG. 5. Since the sleeve 13 will rotate in the opposite direction as it moves from the position shown in FIG. 5 to the position shown in FIG. 4, the sleeve 13 again moves a greater straight line distance than does the rod 12, thereby allowing the tip 27 of the rod 12 to protrude beyond the end of the sleeve 13, as shown in FIG. 4. The above sequence is then repeated as another workpiece enters die opening 40.

A forming machine may include one or more of the knockout assemblies on the die or punch side of the machine. A wide variety of tips may be used on the rod in combination with different die shapes.

I claim:

1. A knockout assembly for ejecting a blank from a die of a forming machine comprising:
    (a) a body positioned in said forming machine adjacent said die,
    (b) a rod slidably mounted in said body and in contact with said blank,
    (c) a sleeve slidably mounted on said rod and in contact with said blank,
    (d) means to contact said rod to move said rod and said sleeve in a straight line to eject said blank from said die,
    (e) guide means to rotate said sleeve while said sleeve moves in said straight line, and
    (f) cam means cooperating with said guide means to cause said sleeve to move a straight line distance different than the straight line distance moved by said rod whereby the contact between said blank and said rod or said sleeve and said blank is broken before said blank is ejected from said die.

2. The knockout assembly described in claim 1 wherein the guide means of subparagraph (e) includes a cam follower fixed to said sleeve and in contact with a helical cam surface in said body.

3. The knockout assembly described in claim 1 wherein the portion of said rod in contact with said blank is shaped to produce an indentation in said blank.

4. The knockout assembly described in claim 1 wherein the guide means of subparagraph (e) includes a cam follower fixed to said sleeve and in contact with a helical cam surface in said body and the cam means of (f) includes a first cam surface on said rod extending obliquely to the direction of movement of said rod and a second cam surface on said sleeve in contact with said first cam surface.

5. The knockout assembly of claim 1 wherein said die has an opening within which said blank is formed and the rod of subparagraph (b) and the sleeve of subparagraph (c) extend into said opening.

6. The knockout assembly of claim 5 wherein the means of subparagraph (d) includes a machine rod positioned on the side of said body opposite said die and in contact with said rod.

7. The knockout assembly described in claim 1 wherein the cam means of subparagraph (f) includes a first cam surface on said rod extending obliquely to the direction of movement of said rod and a second cam surface on said sleeve in contact with said first cam surface.

8. The knockout assembly described in claim 7 including spring means adapted to maintain continuous contact between said first and second cam surfaces.

References Cited
UNITED STATES PATENTS

| | | | |
|---|---|---|---|
| 1,970,085 | 8/1934 | Freter | 10—24 |
| 2,505,030 | 4/1950 | Cote | 10—129 |
| 2,568,439 | 9/1951 | Friedman | 10—7 |
| 2,573,218 | 10/1951 | Pavelka | 10—11 |
| 2,680,860 | 6/1954 | Friedman | 10—11 |
| 2,715,232 | 8/1955 | Egan | 10—24 |
| 2,845,638 | 8/1958 | Sciullo. | |

CHARLES W. LANHAM, Primary Examiner

E. M. COMBS, Assistant Examiner

U.S. Cl. X.R.

10—72